(12) United States Patent
Spendlove et al.

(10) Patent No.: US 12,071,746 B2
(45) Date of Patent: Aug. 27, 2024

(54) SYSTEM AND METHOD FOR ASSISTED POSITIONING OF TRANSPORT VEHICLES RELATIVE TO A WORK MACHINE DURING MATERIAL LOADING

(71) Applicant: Deere & Company, Moline, IL (US)

(72) Inventors: Jonathan Spendlove, Bettendorf, IA (US); Alex J. Anhalt, Davenport, IA (US); Giovanni A. Wuisan, Epworth, IA (US); Zimin W. Vilar, Dubuque, IA (US); Sean A. Mairet, Dubuque, IA (US); Andrew W. Kahler, Davenport, IA (US)

(73) Assignee: Deere & Company, Moline, IL (US)

( * ) Notice: Subject to any disclaimer, the term of this patent is extended or adjusted under 35 U.S.C. 154(b) by 271 days.

(21) Appl. No.: 17/539,313

(22) Filed: Dec. 1, 2021

(65) Prior Publication Data

US 2022/0364335 A1    Nov. 17, 2022

Related U.S. Application Data

(60) Provisional application No. 63/187,813, filed on May 12, 2021.

(51) Int. Cl.
| | |
|---|---|
| *E02F 9/26* | (2006.01) |
| *B65G 67/22* | (2006.01) |
| *E02F 9/20* | (2006.01) |

(52) U.S. Cl.
CPC .............. *E02F 9/265* (2013.01); *B65G 67/22* (2013.01); *E02F 9/2004* (2013.01); *E02F 9/2029* (2013.01)

(58) Field of Classification Search
CPC ....... E02F 9/265; E02F 9/2004; E02F 9/2029; E02F 3/435; E02F 9/2045; B65G 67/22
See application file for complete search history.

(56) References Cited

U.S. PATENT DOCUMENTS

| | | |
|---|---|---|
| 5,646,844 A | 7/1997 | Gudat et al. |
| 7,671,725 B2 | 3/2010 | Tsuji et al. |

(Continued)

FOREIGN PATENT DOCUMENTS

| | | | |
|---|---|---|---|
| JP | 2019200462 A | * | 11/2019 |
| WO | 2014166331 A1 | | 10/2014 |
| WO | 2018021321 A1 | | 2/2018 |

OTHER PUBLICATIONS

Machine translation of JP2019200462A (Year: 2024).*
German Search Report issued in application No. 102022202953.4 dated Apr. 15, 2024, 12 pages.

*Primary Examiner* — Aniss Chad
*Assistant Examiner* — Jennifer M Anda
(74) *Attorney, Agent, or Firm* — Gary L. Montle; Lucian Wayne Beavers; Patterson Intellectual Property Law, PC (57) ABSTRACT

A system and method are provided for assisted positioning of a loading container of a transport vehicle with respect to a work machine during material loading operations. A target loading position is determined for at least the loading container relative to at least an undercarriage of the work machine. The target loading position may be based on user input, and/or automatically determined based on a selected swing angle or range for an implement (e.g., boom assembly), a distance from the work machine, etc. Output signals are generated corresponding to the target loading position, and optionally to a determined route of travel corresponding to a current position of the transport vehicle and the target loading position for at least the loading container.

17 Claims, 6 Drawing Sheets

(56) References Cited

U.S. PATENT DOCUMENTS

| | | |
|---|---|---|
| 7,949,449 B2 | 5/2011 | Koch et al. |
| 8,626,406 B2 | 1/2014 | Schleicher et al. |
| 8,843,311 B2 | 9/2014 | Takeda |
| 8,954,252 B1 | 2/2015 | Urmson et al. |
| 9,052,716 B2* | 6/2015 | Tanaka ..................... B60P 1/30 |
| 9,221,659 B2 | 12/2015 | Fukasu et al. |
| 9,415,953 B2 | 8/2016 | Bonefas |
| 9,519,288 B2 | 12/2016 | Friend |
| 9,567,731 B2 | 2/2017 | Darukhanavala et al. |
| 9,712,791 B2 | 7/2017 | Kim et al. |
| 9,908,385 B2 | 3/2018 | Chundrlik, Jr. et al. |
| 9,946,451 B2 | 4/2018 | Kim et al. |
| 10,479,354 B2 | 11/2019 | Posselius et al. |
| 10,662,613 B2 | 5/2020 | Ready-Campbell et al. |
| 10,801,177 B2 | 10/2020 | Ready-Campbell et al. |
| 10,894,561 B2 | 1/2021 | Kaufmann et al. |
| 10,968,602 B2 | 4/2021 | Hendricks |
| 11,111,931 B2 | 9/2021 | Muraoka et al. |
| 2013/0046525 A1 | 2/2013 | Ali et al. |
| 2015/0189216 A1 | 7/2015 | Fukuchi et al. |
| 2015/0232125 A1 | 8/2015 | Kriel et al. |
| 2016/0223350 A1* | 8/2016 | Lewis ............. G08G 1/096725 |
| 2017/0037592 A1 | 2/2017 | Wan |
| 2017/0131722 A1 | 5/2017 | Hiramatsu et al. |
| 2017/0135277 A1 | 5/2017 | Hiramatsu et al. |
| 2018/0035050 A1 | 2/2018 | Lu et al. |
| 2018/0179732 A1 | 6/2018 | Bartsch et al. |
| 2018/0210454 A1 | 7/2018 | Ready-Campbell et al. |
| 2020/0238881 A1 | 7/2020 | Hendricks |
| 2021/0164192 A1* | 6/2021 | Konda ................... E02F 9/2041 |
| 2021/0292998 A1* | 9/2021 | Kawamoto ............ E02F 9/261 |
| 2022/0097621 A1* | 3/2022 | Nakamura ............ E02F 9/2029 |
| 2023/0003003 A1* | 1/2023 | Shimada ............... E02F 9/2054 |
| 2023/0086878 A1* | 3/2023 | Okuwaki .............. E02F 9/2054 |

* cited by examiner

SYSTEM AND METHOD FOR ASSISTED POSITIONING OF TRANSPORT VEHICLES RELATIVE TO A WORK MACHINE DURING MATERIAL LOADING

CROSS-REFERENCES TO RELATED APPLICATIONS

This application claims benefit of U.S. Provisional Patent Application No. 63/187,813, filed May 12, 2021, and which is hereby incorporated by reference.

FIELD OF THE DISCLOSURE

The present disclosure relates generally to work cycles including work machines for material loading and transport vehicles for carrying and dumping the loaded material, and more particularly to systems and methods for assisting such transport vehicles with positioning relative to a desired or otherwise loading position relative to the work machine.

BACKGROUND

Work machines as discussed herein may particularly refer to excavator machines for illustrative purposes, but may also for example include various other machines and equipment, self-propelled or otherwise, which modify the terrain or equivalent working environment in some way, and further are responsible for loading material from the proximate terrain into transport vehicles for delivery to a separate dumping site. Tracked or wheeled ground engaging units may support an undercarriage from the ground surface, and the undercarriage may typically further support one or more work attachments (also or otherwise referred to as work implements) which are used to dig or otherwise extract material from the terrain and to selectively discharge the material into a loading area associated with the transport vehicles, such as for example the container of an articulated dump truck.

As may be appreciated by one of skill in the art, conventional methods of communication are often relatively primitive between the respective drivers of work machines and transport vehicles. The work machine may typically be positioned appropriately relative to a desired digging site, wherein it is desirable for the transport vehicle (and most particularly the loading container thereof) to be positioned in a particular location or within a range of locations relative to the work machine and/or digging site. As but one example, V-pattern (also referred to as Y-pattern) loading may be desired for certain types of work machine relative to the digging site, but this requires the transport vehicle to be appropriately located and oriented relative to one or both of the work machine and the digging site.

Figure 5:
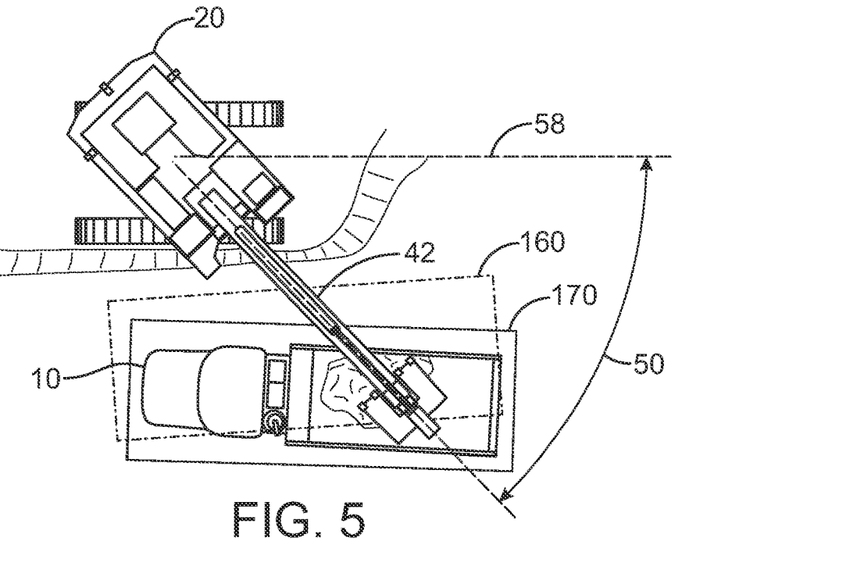
FIG. 5 is an overhead view representing an exemplary position of a transport vehicle outside of a virtual representation of a target loading position as disclosed herein.

Unfortunately, drivers of the transport vehicles may frequently be unaware of the preferred loading position or may simply pull over haphazardly when approaching the work machine. As represented for example in FIG. 5, an excavator 20 is positioned on top of a bench associated with a digging site and further with respect to a preferred loading position 160 for a transport vehicle 10/loading container 14. However, while the cab of the truck 10 is positioned inside of the preferred loading position 160 the current position 170 of the loading container 14 itself is angled away from the excavator 20 and potentially a cause of overreach by the boom assembly during the loading operation.

This may typically require the transport vehicle to reverse and re-position itself, thereby wasting time and fuel, and in some cases the work machine even physically engages and moves the loading container itself.

BRIEF SUMMARY

The current disclosure provides an enhancement to conventional systems, at least in part by introducing a novel system and method for generating signals to direct a transport vehicle into a preferred location for a material loading process, and preferably for monitoring progress of the transport vehicle with respect to the preferred location.

In one embodiment, a method as disclosed herein is provided for assisted positioning of a transport vehicle with respect to a work machine during an operation for loading material into a loading container of the transport vehicle via a work implement coupled to the work machine. A target loading position is automatically determined for at least the loading container of the transport vehicle relative to at least an undercarriage of the work machine. One or more output signals may then be generated corresponding to the target loading position.

In one exemplary aspect according to the above-referenced embodiment, the work implement may be configured to swing about at least a vertical axis relative to the undercarriage, and the target loading position is determined based at least in part on a selected swing angle or range of swing angles with respect to an orientation of the undercarriage.

In another exemplary aspect according to the above-referenced embodiment, the work implement may be configured to swing about a vertical axis relative to the undercarriage, and the target loading position is determined based at least in part on a selected swing angle or range of swing angles with respect to an axis of the work implement in a selected digging position.

In another exemplary aspect according to the above-referenced embodiment, the target loading position is determined based at least in part on a distance from the undercarriage and/or a selected digging position.

In another exemplary aspect according to the above-referenced embodiment, outcome data may be generated and stored in data storage corresponding to a plurality of loading cycles. The stored outcome data may further be correlated with respect to loading cycle data comprising a swing angle with respect to an orientation of the undercarriage; a loading position relative to the undercarriage; a digging position relative to the undercarriage; and/or a determined profile of work area terrain. The target loading position for a given loading cycle may further be determined based at least in part on outcome data retrieved from data storage based on current loading cycle data.

In another exemplary aspect according to the above-referenced embodiment, one or more routes of travel are determined for the transport vehicle corresponding to a current position of the transport vehicle and the target loading position for at least the loading container. The one or more output signals may be generated corresponding to the one or more determined routes of travel and the target loading position.

In another exemplary aspect according to the above-referenced embodiment, the one or more output signals may be transmitted to a controller associated with the transport vehicle, and control data may be generated for at least a steering control unit of the transport vehicle.

In another exemplary aspect according to the above-referenced embodiment, the one or more output signals may be transmitted to a controller associated with the transport vehicle, and image data may be generated corresponding to:

at least one of the determined one or more routes of travel; and/or the target loading position.

In another exemplary aspect according to the above-referenced embodiment, a displayed route of travel may be selectively replaceable with another determined route of travel via an onboard user interface of the transport vehicle.

In another exemplary aspect according to the above-referenced embodiment, a first image layer displayed on an onboard user interface of the transport vehicle may comprise captured images of surroundings of the transport vehicle, and a second image layer displayed on the onboard user interface may comprise the image data superposed with respect to the first image layer.

In another exemplary aspect according to the above-referenced embodiment, the target loading position may be determined based at least in part on manual user inputs via an onboard user interface associated with the work machine.

In another exemplary aspect according to the above-referenced embodiment, at least a graphical representation of surroundings of the work machine is displayed via the onboard user interface, and manual user inputs are enabled with respect to the represented surroundings of the work machine and utilized for automatically determining the target loading position.

In another exemplary aspect according to the above-referenced embodiment, a first image layer is displayed on the onboard user interface of the work machine corresponding to surroundings of the work machine, and a second image layer is displayed on the onboard user interface of the work machine and comprises an image of a work implement swing zone superposed with respect to the first image layer. The second image layer may be selectively moveable about an axis associated with the undercarriage of the work machine based on user input via the onboard user interface, and the target loading position may further be automatically determined based on the selected position of the swing zone.

In another exemplary aspect according to the above-referenced embodiment, the one or more output signals may be generated to provide audio and/or visual indications of a position of the loading container or a detected movement of the loading container relative to a determined route of travel and/or the target loading position.

In another embodiment as disclosed herein, a system is provided for assisted positioning of a transport vehicle with respect to a work machine during an operation for loading material into a loading container of the transport vehicle via a work implement coupled to the work machine. The system includes an onboard user interface associated with the work machine and comprising a display unit, which may for example be implemented to receive user input corresponding to a target loading position. One or more sensors such as for example image data sources may be configured to generate data corresponding to at least surroundings of the work machine, which may be used for example to detect and monitor a location of the loading container relative to the target position. A controller is functionally linked to the onboard user interface and the one or more sensors and configured to direct the performance of operations according to the above-referenced method embodiment and optionally one or more of the exemplary aspects therefor.

Numerous objects, features and advantages of the embodiments set forth herein will be readily apparent to those skilled in the art upon reading of the following disclosure when taken in conjunction with the accompanying drawings.

DETAILED DESCRIPTION

Referring now to FIGS. 1-10, various embodiments may now be described of an inventive system and method.

Figure 1:
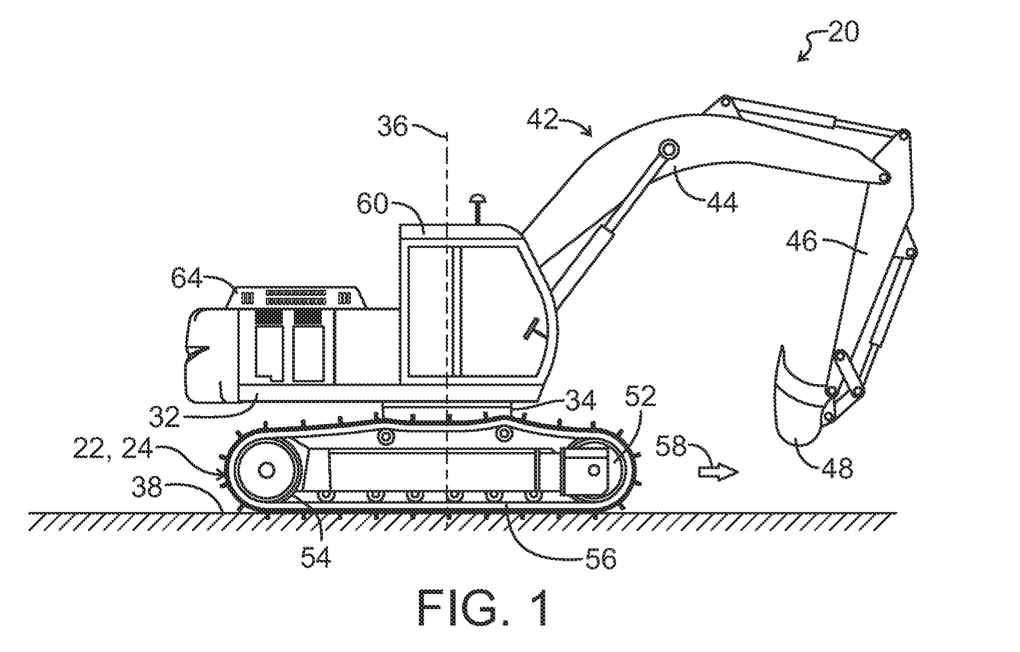
FIG. 1 is a perspective view representing an exemplary work machine according to the present disclosure.

FIG. 1 in a particular embodiment as disclosed herein shows a representative work machine 20 in the form of, for example, a tracked excavator machine. The work machine 20 includes an undercarriage 22 with first and second ground engaging units 24 driven by first and second travel motors (not shown), respectively. While the ground engaging units 24 of the illustrated embodiment include left and right tracks, wheeled ground engaging units 24 are also contemplated, or even an undercarriage which is not supported by movable ground engaging units 24 at all.

A main frame 32 is supported from the undercarriage 22 by a swing bearing 34 such that the main frame 32 is pivotable about a pivot axis 36 relative to the undercarriage 22. The pivot axis 36 is substantially vertical when a ground surface 38 engaged by the ground engaging units 24 is substantially horizontal. A swing motor (not shown) is configured to pivot the main frame 32 on the swing bearing 34 about the pivot axis 36 relative to the undercarriage 22.

A work implement 42 in the context of the referenced work machine 20 includes a boom assembly with a boom 44, an arm 46 pivotally connected to the boom 44, and a working tool 48. The term "implement" may be used herein to describe the boom assembly (or equivalent thereof) collectively, or individual elements of the boom assembly or equivalent thereof. The boom 44 is pivotally attached to the main frame 32 to pivot about a generally horizontal axis relative to the main frame 32. The working tool 48 in this embodiment is an excavator shovel (or bucket) which is pivotally connected to the arm 46. The boom assembly (interlinked components defining work implement 42) extends from the main frame 32 along a working direction of the boom assembly 42. The working direction can also be described as a working direction of the boom 44. As described herein, control of the work implement 42 may relate to control of any one or more of the associated components (e.g., boom 44, arm 46, tool 48).

It is within the scope of the present disclosure that the work machine 20 may take various alternative forms and further utilize alternative work implements 42 to modify the proximate terrain.

In the embodiment of FIG. 1, the first and second ground engaging units 24 are tracked ground engaging units, although various alternative embodiments of a work machine 20 are contemplated wherein the ground engaging units 24 may be wheeled ground engaging units. Each of the tracked ground engaging units 24 includes an idler 52, a drive sprocket 54, and a track chain 56 extending around the idler 52 and the drive sprocket 54. The travel motor of each tracked ground engaging unit 24 drives its respective drive sprocket 54. Each tracked ground engaging unit 24 is represented as having a forward traveling direction 58 defined from the drive sprocket 54 toward the idler 52. The forward traveling direction 58 of the tracked ground engaging units 24 also defines a forward traveling direction 58 of the undercarriage 22 and thus of the work machine 20. In some applications, including uphill travel as further discussed below, the orientation of the undercarriage 22 may be reversed such that a traveling direction of the work machine 20 is defined from the idler 52 toward its respective drive sprocket 54, whereas the work implement(s) 42 is still positioned ahead of the undercarriage 22 in the traveling direction.

Although an excavator as the work machine 20 may be self-propelled in accordance with the above-referenced elements, other forms of work machines 20 may be contemplated within the scope of the present disclosure that are not self-propelled, unless otherwise specifically noted.

An operator's cab 60 may be located on the main frame 32. The operator's cab 60 and the boom assembly 42 may both be mounted on the main frame 32 so that the operator's cab 60 faces in the working direction (e.g., forward direction 58) of the boom assembly. A control station (not shown) may be located in the operator's cab 60. The control station may include or otherwise be associated with a user interface as further described below. As used herein, directions with regard to work machine 20 may be referred to from the perspective of an operator seated within the operator cab 60; the left of the work machine is to the left of such an operator, the right of the work machine is to the right of such an operator, a front-end portion (or fore) of the work machine is the direction such an operator faces, a rear-end portion (or aft) of the work machine is behind such an operator, a top of the work machine is above such an operator, and a bottom of the work machine below such an operator.

Also mounted on the main frame 32 is an engine 64 for powering the work machine 20. The engine 64 may be a diesel internal combustion engine but is not so limited and within the scope of the present disclosure the work machine 20 may alternatively be driven by a non-combustion power source (not shown). The engine 64 may drive a hydraulic pump to provide hydraulic power to the various operating systems of the work machine 20.

Figure 2:
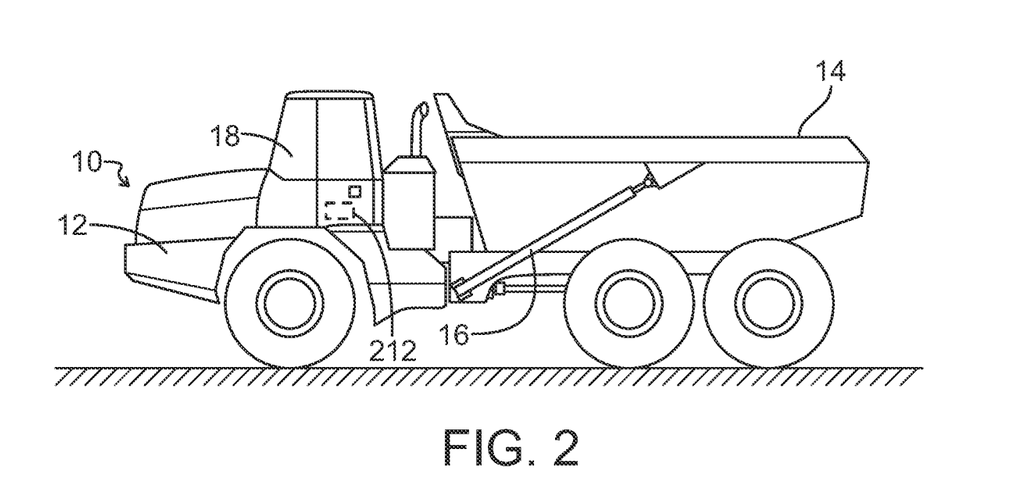
FIG. 2 is a perspective view representing an exemplary transport vehicle according to the present disclosure.

An articulated dump truck as representing a transport vehicle 10 in FIG. 2 may include a plurality of wheels and associated axles, and a frame 12 supporting a loading container 14 (e.g., truck bed) having for example a loading surface at the bottom of an interior area surrounded by sidewalls, and a top edge at least part of which may typically be in parallel with the ground surface. A hydraulic piston-cylinder unit 16 may be coupled between the frame 12 and the loading container 14 and configured to selectively extend and raise/pivot the loading container 14 rearward to a dumping position, and to retract and lower/pivot the loading container forward from the dumping position to a travel and loading position (as shown). An operator's cab 18 of the transport vehicle 10 may be located on the frame 12, wherein directions with regard to the transport vehicle 10 may be referred to from the perspective of an operator seated within the operator cab 18; the left of the transport vehicle is to the left of such an operator, the right of the transport vehicle is to the right of such an operator, a front-end portion (or fore) of the transport vehicle is the direction such an operator faces, a rear-end portion (or aft) of the transport vehicle is behind such an operator, a top of the transport vehicle is above such an operator, and a bottom of the transport vehicle below such an operator.

A controller 212 for the transport vehicle 10 may in some embodiments comprise or otherwise be associated with an operator interface in the operator's cab 18, as further described below.

An image data source 104 (not shown in FIG. 1) may be mounted on the work machine 20 in accordance with the present disclosure. The location of the image data source 104 may be chosen such that a field of view thereof encompasses surroundings of the work machine and preferably at least the loading container 14 of the transport vehicle 10 during at least a portion of a material loading operation wherein the surface of the loading container is retracted into a substantially horizontal orientation as shown, and may further preferably be chosen such that the field of view encompasses all four top edges of the loading container 14. In some embodiments, a plurality of image data sources 104 or an image data source 104 that is moveable or reconfigurable in position may be provided to enable stitching together multiple images for an overhead (i.e., birds-eye) view of the work machine and associated surroundings, or for example to account for the differences in potential relative elevations, positions, and orientations with respect to a transport vehicle during loading.

Figure 3:
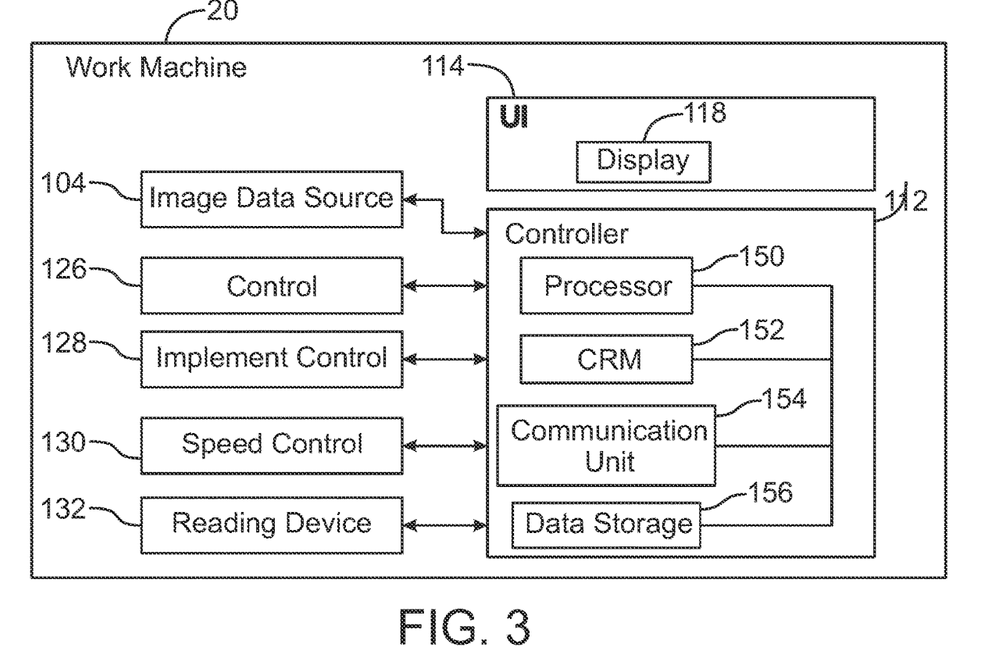
FIG. 3 is a block diagram representing a control system for the work machine according to an embodiment of the present disclosure.

As schematically illustrated in FIG. 3, the work machine 20 in an embodiment as disclosed herein includes a control system including a controller 112. The controller 112 may be part of the machine control system of the work machine 20, or it may be a separate control module.

As referenced above, the controller 112 is configured to receive input signals from some or all of various sensors including for example image data sources 104 such as cameras and collectively defining an imaging system. The image data sources 104 may include video cameras configured to record an original image stream and transmit corresponding data to the controller 112. In the alternative or in addition, the image data sources 104 may include one or more of an infrared camera, a stereoscopic camera, a PMD camera, or the like. One of skill in the art may appreciate that high resolution light detection and ranging (LiDAR) scanners, radar detectors, laser scanners, and the like may be implemented as equivalent sensors within the scope of the present disclosure. The number and orientation of said image data sources 104 may vary in accordance with the type of work machine 20 and relevant applications, but may at least be provided with respect to an area in a travelling direction of the work machine 20 and configured to capture image data associated with a loading area such as for example associated with the loading container 14 and proximate the work machine 20.

The position and size of an image region recorded by a respective camera as an image data source 104 may depend on the arrangement and orientation of the camera and the camera lens system, in particular the focal length of the lens of the camera, but may desirably be configured to capture substantially the entire loading area (e.g., of a loading container 14) throughout a loading operation. One of skill in the art may further appreciate that image data processing functions may be performed discretely at a given image data source if properly configured, but also or otherwise may generally include at least some image data processing by the controller or other downstream data processor. For example, signals from any one or more image data sources may be provided for three-dimensional point cloud generation, image segmentation, object delineation and classification, and the like, using image data processing tools as are known in the art in combination with the objectives disclosed. Accordingly, the term "image data" as used herein may encompass output signals from an image data source corresponding directly to captured images, and/or data generated from output signals from an image data source and which is used for image generation or display. For example, image data from an image data source may be processed to determine distances, identify objects, characterize surroundings, or the like based on images represented by the image data, or image data from an image data source may also be processed to generate information used for the display of graphical representations such as for example augmented reality images or corresponding indicia as superposed with other displayed images as further described herein.

Various additional sensors (not shown in FIG. 3) may be provided for generating output signals to the controller 112 and representing values of interest with respect to functions as further described below. Inertial measurement units (IMUs) may be mounted to respective components of the work implement 42, the main frame 32, and/or to piston-cylinder units to detect the relative hydraulically actuated extensions thereof, or any known alternatives as may be known to those of skill in the art. Sensors as are known in the art may be provided to detect machine operating conditions or positioning, including for example an orientation sensor, global positioning system (GPS) sensors, work machine speed sensors, and the like, and whereas one or more of these sensors may be discrete in nature the sensor system may further refer to signals provided from the machine control system.

In an embodiment, any of the aforementioned sensors may be supplemented using radio frequency identification (RFID) devices or equivalent wireless transceivers on one or more work implements 42, the main frame 32, the undercarriage 22, and the like. Such devices may for example be implemented to determine and/or confirm a distance and/or orientation there between.

Other sensors may collectively define an object detection system, alone or in combination with one or more aforementioned sensors for improved data collection, various examples of which may include ultrasonic sensors, laser scanners, radar wave transmitters and receivers, thermal sensors, imaging devices, structured light sensors, other optical sensors, and the like. The types and combinations of sensors for obstacle detection may vary for a type of work machine, work area, and/or application, but generally may be provided and configured to optimize recognition of objects proximate to, or otherwise in association with, a determined working area of the work machine and/or a transport vehicle 10 therein.

The controller 112 of the work machine 20 may be configured to produce outputs, as further described below, to a user interface 114 associated with a display unit 118 for display to the human operator. The controller 112 may be configured to receive inputs from the user interface 114, such as user input provided via the user interface 114. Not specifically represented in FIG. 3, the controller 112 of the work machine 20 may in some embodiments further receive inputs from and generate outputs to remote devices associated with a user via a respective user interface, for example a display unit with touchscreen interface. Data transmission between for example the vehicle control system and a remote user interface may take the form of a wireless communications system and associated components as are conventionally known in the art. In certain embodiments, a remote user interface and vehicle control systems for respective work machines 20 may be further coordinated or otherwise interact with a remote server or other computing device for the performance of operations in a system as disclosed herein.

The controller 112 may in various embodiments be configured to generate control signals for controlling the operation of respective actuators, or signals for indirect control via intermediate control units, associated with a machine steering control system 126, a machine implement control system 128, and an engine speed control system 130. The control systems 126, 128, 130 may be independent or otherwise integrated together or as part of a machine control unit in various manners as known in the art. The controller 112 may for example generate control signals for controlling the operation of various actuators, such as hydraulic motors or hydraulic piston-cylinder units (not shown), and electronic control signals from the controller 112 may actually be received by electro-hydraulic control valves associated with the actuators such that the electro-hydraulic control valves will control the flow of hydraulic fluid to and from the respective hydraulic actuators to control the actuation thereof in response to the control signal from the controller 112.

A reading device 132 as conventionally known in the art such as for example an RFID device, barcode scanner, or the like may further be provided and communicatively linked to the controller 112 for obtaining readable information associated with a particular transport vehicle 10.

The controller 112 includes or may be associated with a processor 150, a computer readable medium 152, a communication unit 154, and data storage 156 such as for example a database network. It is understood that the controller 112 described herein may be a single controller having some or all of the described functionality, or it may include multiple controllers wherein some or all of the described functionality is distributed among the multiple controllers.

Various operations, steps or algorithms as described in connection with the controller 112 can be embodied directly in hardware, in a computer program product such as a software module executed by the processor 150, or in a combination of the two. The computer program product can reside in RAM memory, flash memory, ROM memory, EPROM memory, EEPROM memory, registers, hard disk, a removable disk, or any other form of computer-readable medium 152 known in the art. An exemplary computer-readable medium 152 can be coupled to the processor 150 such that the processor 150 can read information from, and write information to, the memory/storage medium 152. In the alternative, the medium 152 can be integral to the processor 150. The processor 150 and the medium 152 can reside in an application specific integrated circuit (ASIC). The ASIC can reside in a user terminal. In the alternative, the processor 150 and the medium 152 can reside as discrete components in a user terminal.

The term "processor" 150 as used herein may refer to at least general-purpose or specific-purpose processing devices and/or logic as may be understood by one of skill in the art, including but not limited to a microprocessor, a microcontroller, a state machine, and the like. A processor 150 can also be implemented as a combination of computing devices, e.g., a combination of a DSP and a microprocessor, a plurality of microprocessors, one or more microprocessors in conjunction with a DSP core, or any other such configuration.

The communication unit 154 may support or provide communications between the controller 112 and external communications units, systems, or devices, and/or support or provide communication interface with respect to internal components of the work machine 20. The communications unit may include wireless communication system components (e.g., via cellular modem, WiFi, Bluetooth or the like) and/or may include one or more wired communications terminals such as universal serial bus ports.

The data storage 156 as further described below may, unless otherwise stated, generally encompass hardware such as volatile or non-volatile storage devices, drives, electronic memory, and optical or other storage media, as well as in certain embodiments one or more databases residing thereon.

Figure 4:
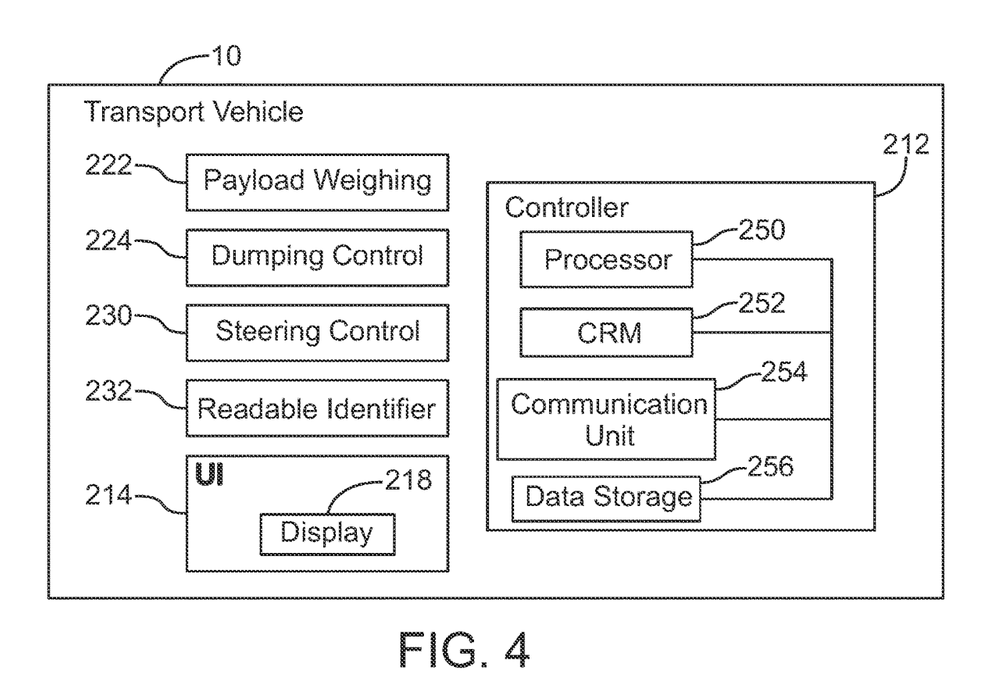
FIG. 4 is a block diagram representing a control system for the transport vehicle according to an embodiment of the present disclosure.

As schematically illustrated in FIG. 4, in certain embodiments of a system as disclosed herein the plurality of transport vehicles 10 may each include a respective control system including a controller 212. The controller 212 may be part of a vehicle control system of the transport vehicle 10, or it may be a separate control module.

The controller 212 of a respective transport vehicle 10 may be configured to receive input signals from a payload weighing unit 222 as is conventionally known in the art for certain articulated dump trucks. The controller 212 may further integrate or otherwise communicate with a dumping control system 224 to selectively direct the operation of the hydraulic piston-cylinder unit 16 for articulating the loading container 14 between a loading position and a dumping position. A steering control system 230 may be utilized as further described below for at least an auto-park mode, and may further include or otherwise be supplemented with speed control, braking control, or the like for a more fully autonomous implementation. The transport vehicle 10 may further comprise a barcode or otherwise generate another form of machine-readable identifier 232 such as for example an RFID signal via a transceiver for communicating readable information to a work machine 20 or the like.

The controller 212 of a respective transport vehicle 10 may be configured to produce outputs, as further described below, to the user interface 214 associated with a display unit 218 for display to the human operator. The controller 212 may be configured to receive inputs from the user interface 214, such as user input provided via the user interface 214.

The controller 212 of a respective transport vehicle 10 may further include or be associated with a processor 250, a computer readable medium 252, a communication unit 254, and data storage 256 such as for example a database network. It is understood that the controller 212 described herein may be a single controller having some or all of the described functionality, or it may include multiple controllers wherein some or all of the described functionality is distributed among the multiple controllers.

Figure 9:
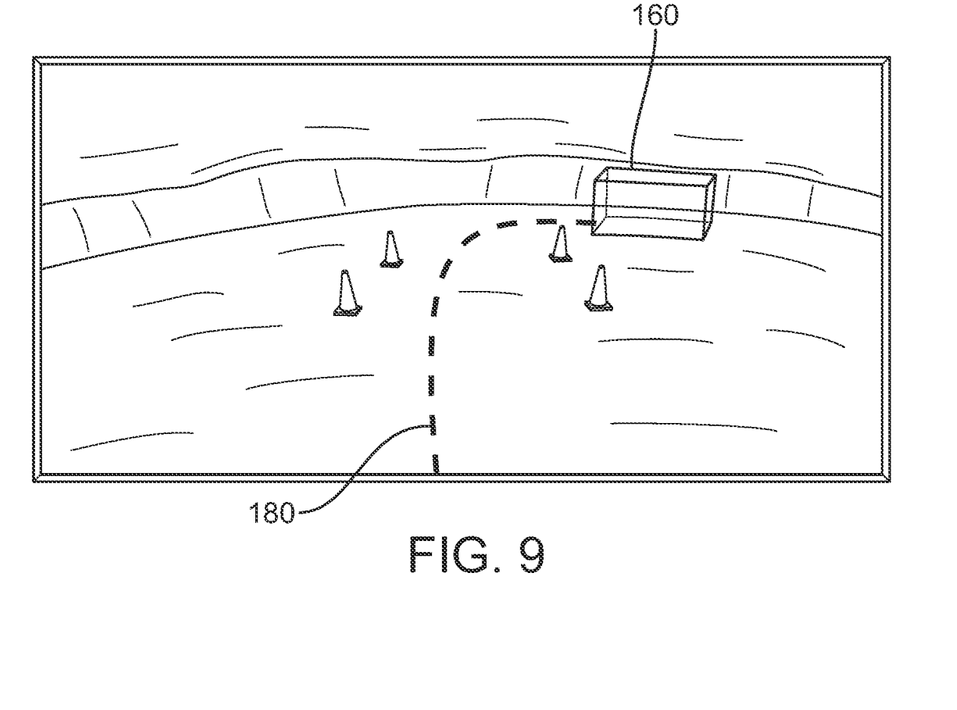
FIG. 9 is a perspective view representing an exemplary route of travel for a transport vehicle to a virtual representation of a target loading position according to an embodiment as disclosed herein.
Figure 10:
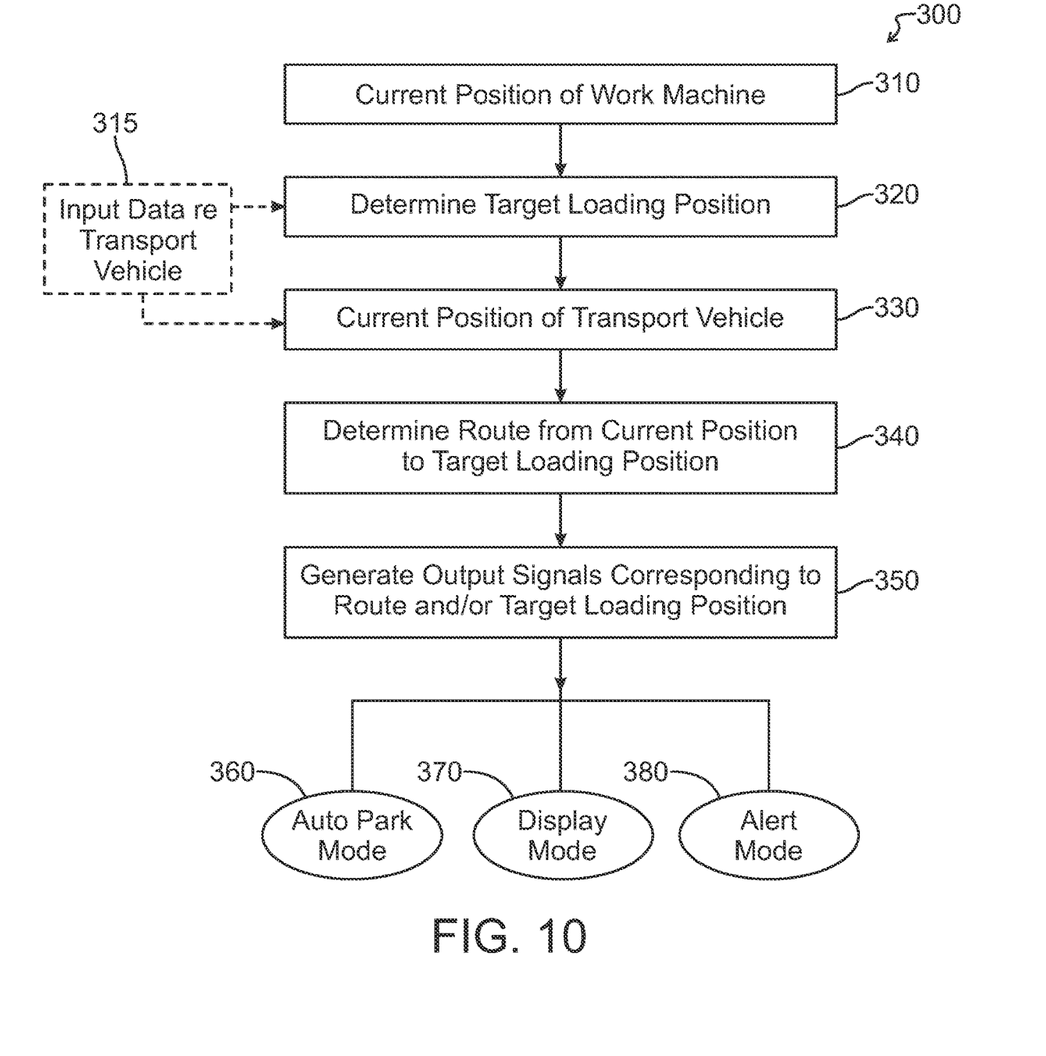
FIG. 10 is a flowchart representing an exemplary method according to an embodiment of the present disclosure.

Referring next to FIG. 10, with further illustrative reference back to FIGS. 1-9, an embodiment of a method 300 may now be described which is exemplary but not limiting on the scope the present disclosure unless otherwise specifically noted. One of skill in the art may appreciate that alternative embodiments may include fewer or additional steps, and that certain disclosed steps may for example be performed in different chronological order or simultaneously. Unless otherwise specifically noted, operations, steps, functions, processes, and the like as disclosed in association with the method 300 may be executed or directed by a single computing device, or via multiple computing devices in operable communication via a communications network. Exemplary such computing devices may include onboard controllers or machine control systems, remote servers, mobile user devices, and the like.

A first step 310 may include detecting a current position of the work machine 20, presumably during a loading operation and located with respect to a digging site. The preferred position of the work machine 20 relative to a digging site may generally vary depending on the type of work machine 20 and a type of material being carried by the work machine 20 to a loading container 14 on a transport vehicle 10. The position of the work machine 20 may be detected using for example one or more image data sources 104 and associated image processing units and algorithms as disclosed above, and/or by using for example alternative sensors such as global positioning system (GPS) sensors, or the like. The position of one or more work implements 42 may further be detected relative to for example an undercarriage 22 of the work machine 20, using inertial sensors, GPS sensors, or the like as conventionally known in the art.

Figure 6:
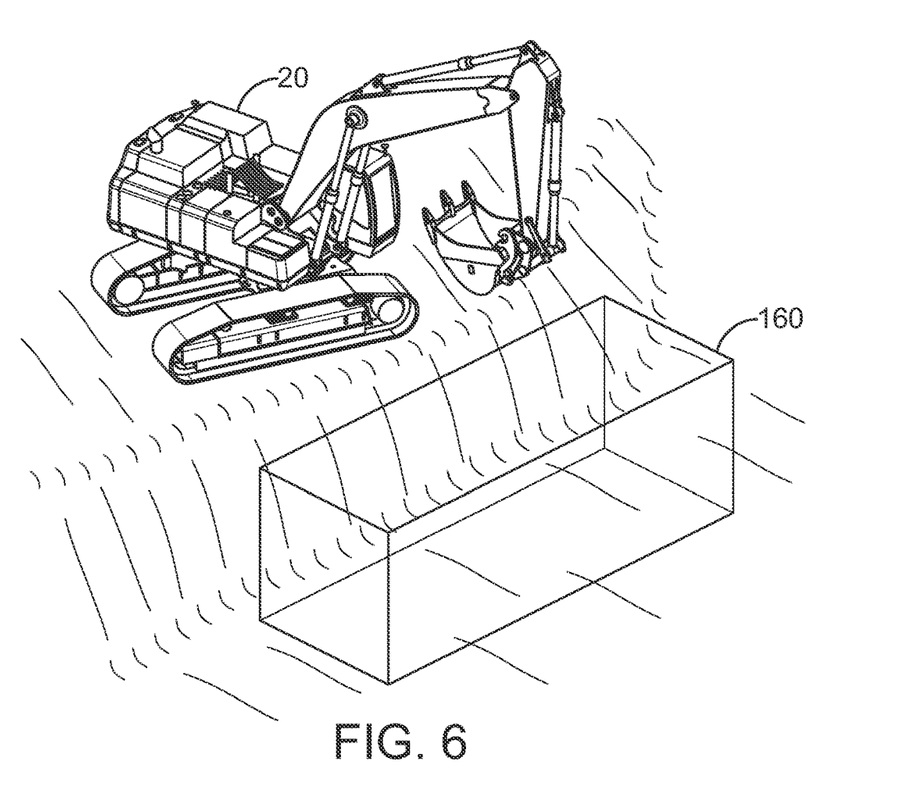
FIG. 6 is a perspective view of an exemplary work machine relative to a virtual representation of a target loading position as disclosed herein.
Figure 7:
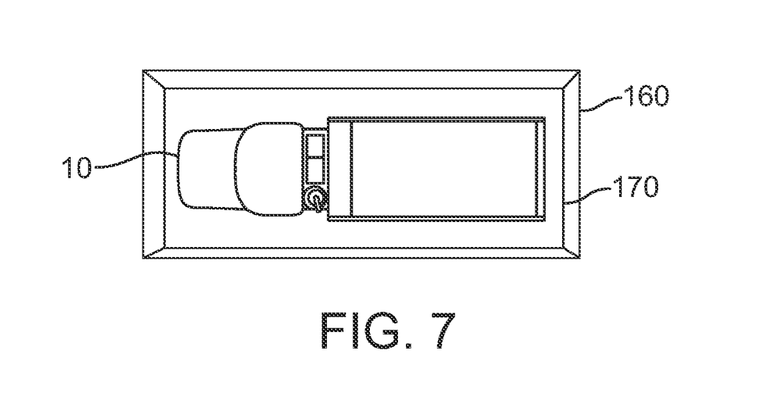
FIG. 7 is an overhead view representing an exemplary position of a transport vehicle inside of a virtual representation of a target loading position as disclosed herein.

The method 300 may continue by determining a target loading position 160 (step 320) for a transport vehicle 10, or in various embodiments more particularly for a loading container 14 of said transport vehicle 10. The target loading position 160 may for example be generated as a virtual three-dimensional area sized to encompass a transport vehicle 10 and loading container 14, as represented in FIGS. 6 and 7. In FIG. 7, the current positions 170 of the cab of the transport vehicle 10 and the loading container 14 are each fully within the target loading position 160, but in various embodiments it may be acceptable for only a current position 170 of the loading container 14 to be fully within the target loading position 160 and the target loading position may be sized accordingly.

The target loading position 160 may be determined based at least in part on a type of work machine 20 and associated work implement(s) 42. For example, a target loading position 160 may be automatically determined or at least proposed to a driver of the work machine 20 based on an orientation of the undercarriage 22 and ground engaging units 24, a ground surface upon which the undercarriage is located (e.g., an elevated bench position as opposed to a flat surface adjacent the digging site or a surface beneath the digging site), an appropriate reach of the work implement (e.g., a fully extended boom assembly further accounting for weight), a selected digging position relative thereto, etc. In an embodiment, loading outcome data may be generated and stored in data storage corresponding to a plurality of loading cycles, and further correlated with respect to loading cycle data. Such loading cycle data may include for example a swing angle with respect to an orientation of the undercarriage, a loading position relative to the undercarriage, a digging position relative to the undercarriage, a determined profile of work area terrain, and the like. The target loading position for a given loading cycle may accordingly be determined based at least in part on favorable or preferred outcome data retrieved from data storage based on detected loading cycle data associated with a current loading cycle.

The target loading position 160 may further account for surroundings of the work machine 20 as determined using sensors such as one or more image data sources 104, for example to identify an appropriate grade for the transport vehicle 10 to traverse and park, and preferably a desired proximity to the bench/pile/bank itself when the work machine 20 is resting thereon.

In various embodiments a target loading position 160 may be automatically retrieved from data storage in accordance with collected input data (step 315) such as detected parameters associated with the transport vehicle during or prior to the loading operation. As one example, a previous loading position may be established and stored with respect to the same transport vehicle, wherein the work machine is configured to identify the transport vehicle using a machine-readable identifier 232 associated with the transport vehicle and a reading device 132 on the work machine. In an embodiment, the readable identifier 232 may be an RFID tag or a barcode.

In embodiments where at least an initial target loading position 160 is determined automatically, the method 300 may enable an operator to confirm or modify the automatically determined target loading position 160 via the onboard user interface or input signals provided from a remote interface such as for example a mobile application separate from the onboard equipment referenced above.

For work machines 20 such as front loaders seeking to utilize classic V-pattern loading, the target loading position 160 may be automatically or at least initially determined to account for a predicted point where the bucket is filled, a first path for reversal from the bank to a stopping point, and a second path from the stopping point to the target loading position 160. The resulting target loading position 160 preferably locates the loading container of the transport vehicle where it should be in relation to the pile to keep it within a three-tire rotation.

In an embodiment, the target loading position 160 may be set manually by the operator. Using an excavator as the exemplary work machine 20, the target loading position 160 may preferably account for a swing zone including for example a swing angle 50 range of thirty-five to forty-five degrees, or a selected swing angle 50 within said range for maximum efficiency, with the swing angle 50 being determined for example relative to a longitudinal axis corresponding to a forward direction 58 of the work machine 20. In various embodiments, the swing angle or swing angle range may be selectively adjusted by the operator or by the control system to account for any one or more of user preference, current conditions, maximum efficiency, etc. In an embodiment, the operator may be presented via the onboard display unit with a graphical representation on the display unit, such as for example a first image layer of an overhead view centered on the work machine and optionally further having a second image layer as a representation of a preferred swing angle for the work implement for a bucket loading position. In various embodiments, the graphical representations need not require actual captured images of the surroundings, but may simply include a top-down satellite view of the map area or a generated (i.e., virtual) image of the corresponding surroundings. The operator may be enabled to selectively modify or rotate the presented swing angle so as to represent a selected bucket emptying position of the work implement 42. The target loading position 160 may be determined to account for a preferred distance from the undercarriage further in view of the selected bucket emptying position, or the distance and/or bearing may also be selected by the operator. The operator may in certain embodiments simply manipulate the work implement components to determine a target loading position wherein associated work implement component positions may be saved in three-dimensional space.

Alternatively, the operator may be enabled to directly select points including a bucket emptying position via the graphical representation on the display unit. For example, selections may be enabled in the overhead view of the first image layer, wherein a virtual swing angle representation is superposed as the second image layer over the first image layer and the target loading position 160 automatically determined therefrom. The term "superposed" as used herein may encompass a second image layer that obscures the underlying first image layer or is transparent and merely overlays the underlying first image layer within the scope of the present disclosure, unless otherwise specifically noted herein.

The method 300 may continue by detecting a current position 170 (step 330) of a transport vehicle 10 approaching the determined target loading position 160, or in various embodiments more particularly detecting the current position of the loading container 14 thereof. The current position 170 may be detected using machine readable information from the transport vehicle 10 itself, such as for example a beacon transmitter or RFID tag as described above for distance estimation with respect to one or more points. Alternatively, or in addition, the contours of the loading container 14 may be visually identified using collected image data from the one or more image data sources 104 associated with the work machine 20 as described above and further processed to determine a current distance, orientation, etc. In one embodiment, an imaging routine may include processing of stereo camera disparity measurements and stored or otherwise developed models in order to segment respective measurements into a floor plane associated for example with a loading surface, loading container sidewalls, a top edge, and the like, wherein said processing may account for a position, orientation, moving speed, etc., of the image data source 104. Segmentation may in some embodiments be further improved via the machine-readable information (e.g., printed text, barcodes, etc.), the work implement(s) 42, or other objects within the image frame. In embodiments where multiple image data sources 104 may be utilized, a known relative position and orientation of the image data sources 104 may further enable object position determination through for example triangulation techniques. Briefly stated, the controller 112 and/or a discrete image processing unit (not shown) may for example utilize conventional image recognition and processing techniques, floor plane modeling, machine learning algorithms, stored loading area data, and the like to analyze the shape and size of an object (e.g., the loading container), to measure a distance to the object from the stereo camera, to identify or predict the extent of the object in the image frame, to measure the orientation of the object in the image frame, and to convert the measurements from the image frame into the work machine frame.

Figure 8:
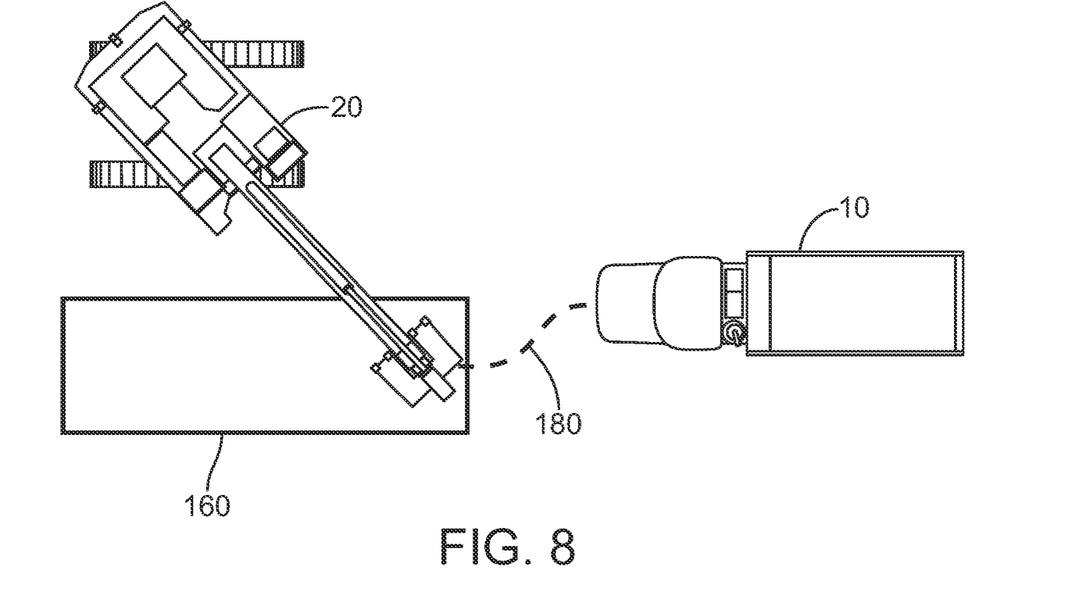
FIG. 8 is an overhead view representing an exemplary route of travel for a transport vehicle to a target loading position according to an embodiment as disclosed herein.

The method 300 with illustrative reference to FIGS. 8 and 9 further includes determining a route 180 (step 340) such as for example a recommended or preferred route from the current position 170 of the transport vehicle 10 to the target loading position 160. The route 180 may for example be determined to account for the intervening terrain and associated objects between the target loading position 160 and the current position 170.

The method 300 may further include generating output signals (step 350) corresponding to the determined route 180 and/or the target loading position 160, based for example on the monitored current position 170 of the transport vehicle 10/loading container 14 with respect thereto.

In an embodiment, the output signals may be provided for implementing an automated parking mode (step 360). Such an embodiment may typically include coordination of the controller 112 associated with the work machine 20 and the controller 212 associated with the transport vehicle 10, for example via bidirectional data communication using a communications network. As one example, when the transport vehicle 10 has reached a selected or threshold distance from the bench/fill site, the output signals are received by the controller 212 of the transport vehicle 10 to inform the driver that an auto-park system is available for the remaining portion of the determined route 180. The operator may then acknowledge activation of the auto park mode, for example via the onboard user interface 214, wherein a steering control system 230 for the transport vehicle automatically takes over steering using control data associated with or otherwise derived from the output signals from the work machine controller 112. In various embodiments, the driver may still be responsible for one or more driving aspects, including for example braking, even during the auto-park mode but a fully autonomous feature may also be contemplated within the scope of the present disclosure.

In another embodiment, with further illustrative reference to FIG. 9, the output signals may further or alternatively be provided for implementing an operator display mode (step 370) via an onboard user interface in the transport vehicle 10. Again, such an embodiment may typically include coordination of the controller 112 associated with the work machine 20 and the controller 212 associated with the transport vehicle 10, for example via bidirectional data communication using a communications network. For example, using an overhead (i.e., top-down) view or a front camera view as a first image layer displayed on the onboard user interface 214 and/or display unit 218, a superposed second image layer may be generated to inform the driver of the transport vehicle 10 of information corresponding to the determined route 180, the target loading position 160, and/or the like, wherein the driver simply drives at least the loading container 14 into position for the loading operation.

In another embodiment, the output signals may still further or alternatively be provided for selectively modulating indicators in an audio and/or visual alert mode (step 380). Such indicators may optionally be generated externally with respect to the transport vehicle 10, for example in the form of a car-wash stoplight or the like, such that bidirectional communications are not required between the controller 112 of the work machine 20 and any systems or devices associated with the transport vehicle 10. In an embodiment, the one or more image data sources 104 associated with the work machine 20 track detected movements such as for example relating to an approach angle of the transport vehicle 10 relative to the determined target loading position 160, the determined route 180, or a combination thereof, and causes a lighting unit to selectively emit based on a status of the detected movements. For example, appropriate signals may light up respective lamps corresponding to commands to turn left, turn right, move forward, and/or stop.

In certain embodiments, various features as disclosed herein may be selectively enabled by an operator via a user interface configured accordingly. For example, a displayed route of travel as automatically provided from the system may be selectively replaceable with another determined route of travel via an onboard user interface of the transport vehicle. As another example, the system may include a selectable operating mode enabling user inputs that are implemented as parameters for determining which route of travel is to be displayed. As still another example, the vehicle operator may be able to select from among the auto-parking mode, a display-only mode, and the like, or such selection may be made for example by a remote administrator.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

One of skill in the art may appreciate that when an element herein is referred to as being "coupled" to another element, it can be directly connected to the other element or intervening elements may be present.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of assisted positioning of a transport vehicle with respect to a work machine during an operation for loading material into a loading container of the transport vehicle via a work implement coupled to the work machine, the method comprising:

generating and storing in data storage loading outcome data corresponding to a plurality of loading cycles for the work machine;

correlating the stored loading outcome data, for each of the plurality of loading cycles, with a position and orientation of the respective loading container, and further with respective loading cycle data for the work machine comprising a swing angle with respect to an orientation of the undercarriage, a loading position relative to the undercarriage, a digging position relative to the undercarriage, and/or a determined profile of work area terrain;

automatically determining a target loading position and orientation for at least the loading container of the transport vehicle relative to at least an undercarriage of the work machine, wherein the target loading position and orientation for a current loading cycle is determined based at least in part on current loading cycle data and a desired loading outcome; and generating to a controller associated with the transport vehicle one or more output signals corresponding to the target loading position and orientation.

2. The method of claim 1, wherein the work implement is configured to swing about at least a vertical axis relative to the undercarriage, and the target loading position and orientation is determined based at least in part on a selected swing angle or range of swing angles with respect to an orientation of the undercarriage.

3. The method of claim 1, wherein the work implement is configured to swing about at least a vertical axis relative to the undercarriage, and the target loading position and orientation is determined based at least in part on a selected swing angle or range of swing angles with respect to an axis of the work implement in a selected digging position.

4. The method of claim 1, wherein the target loading position and orientation is determined based at least in part on a distance from the undercarriage and/or a selected digging position.

5. The method of claim 1, further comprising:
determining one or more routes of travel for the transport vehicle corresponding to a current position of the transport vehicle and the target loading position and orientation for at least the loading container;
wherein the one or more output signals are generated corresponding to the one or more determined routes of travel and the target loading position and orientation.

6. The method of claim 5, further comprising generating control data for at least a steering control unit of the transport vehicle.

7. The method of claim 5, wherein the one or more output signals comprise image data corresponding to: at least one of the determined one or more routes of travel; and/or the target loading position.

8. The method of claim 7, wherein a displayed route of travel is selectively replaceable with another determined route of travel via an onboard user interface of the transport vehicle.

9. The method of claim 7, wherein a first image layer displayed on an onboard user interface of the transport vehicle comprises captured images of surroundings of the transport vehicle, and wherein a second image layer displayed on the onboard user interface comprises the image data superposed with respect to the first image layer.

10. The method of claim 1, wherein the target loading position and orientation is determined based at least in part on manual user inputs via an onboard user interface associated with the work machine.

11. The method of claim 10, wherein at least a graphical representation of surroundings of the work machine is displayed via the onboard user interface, and manual user inputs are enabled with respect to represented surroundings of the work machine and utilized for automatically determining the target loading position and orientation.

12. The method of claim 1, wherein the one or more output signals are generated to provide audio and/or visual indications of a position of the loading container or a detected movement of the loading container relative to a determined route of travel and/or the target loading position and orientation.

13. A system of assisted positioning of a transport vehicle with respect to a work machine during an operation for loading material into a loading container of the transport vehicle via a work implement coupled to the work machine, the system comprising:
one or more sensors configured to generate data corresponding to surroundings of the work machine and/or a position of the work implement relative to an undercarriage of the work machine; and
a controller associated with the work machine, functionally linked to the one or more sensors and configured to:
generate and store in data storage loading outcome data corresponding to a plurality of loading cycles for the work machine; and
correlate the stored loading outcome data, for each of the plurality of loading cycles, with a position and orientation of the respective loading container, and further with respective loading cycle data for the work machine comprising a swing angle with respect to an orientation of the undercarriage, a loading position relative to the undercarriage, a digging position relative to the undercarriage, and/or a determined profile of work area terrain;
wherein the controller is further configured for a current loading cycle to:
determine a target loading position and orientation for at least the loading container of the transport vehicle relative to at least the undercarriage of the work machine, wherein the target loading position and orientation for a given loading cycle is determined based at least in part on current loading cycle data and a desired loading outcome; and
generate to a controller associated with the transport vehicle one or more output signals corresponding to the target loading position and orientation.

14. The system of claim 13, wherein the controller associated with the work machine is further configured to determine a route of travel for the transport vehicle corresponding to a current position of the transport vehicle and the target loading position and orientation for at least the loading container.

15. The system of claim 13, wherein the work implement is configured to swing about at least a vertical axis relative to the undercarriage, and the target loading position and orientation is determined based at least in part on a selected swing angle or range of swing angles with respect to an orientation of the undercarriage, and/or the selected swing angle or range of swing angles with respect to an axis of the work implement in a selected digging position, and/or a distance from the undercarriage and/or the selected digging position.

16. The system of claim 13, wherein the controller is configured to:
determine one or more routes of travel for the transport vehicle corresponding to a current position of the transport vehicle and the target loading position and orientation for at least the loading container;
wherein the one or more output signals are generated corresponding to the one or more determined routes of travel and the target loading position.

17. The system of claim 13, wherein the controller associated with the transport vehicle is configured to generate control data for at least a steering control unit of the transport vehicle.

* * * * *